(12) United States Patent
Yokogawa

(10) Patent No.: US 9,088,191 B2
(45) Date of Patent: Jul. 21, 2015

(54) ARMATURE AND MOTOR

(71) Applicant: NIDEC CORPORATION, Minami-ku, Kyoto (JP)

(72) Inventor: Tomoyoshi Yokogawa, Kyoto (JP)

(73) Assignee: Nidec Corporation, Kyoto (JP)

( * ) Notice: Subject to any disclaimer, the term of this patent is extended or adjusted under 35 U.S.C. 154(b) by 437 days.

(21) Appl. No.: 13/714,775

(22) Filed: Dec. 14, 2012

(65) Prior Publication Data
US 2013/0193800 A1 Aug. 1, 2013

(30) Foreign Application Priority Data
Jan. 31, 2012 (JP) ................................. 2012-018529

(51) Int. Cl.
| | |
|---|---|
| H02K 3/34 | (2006.01) |
| H02K 3/52 | (2006.01) |
| H02K 3/30 | (2006.01) |
| H02K 3/46 | (2006.01) |
| H02K 3/32 | (2006.01) |

(52) U.S. Cl.
CPC ................ H02K 3/345 (2013.01); H02K 3/522 (2013.01); *H02K 3/30* (2013.01); *H02K 3/325* (2013.01); *H02K 3/46* (2013.01); *H02K 2203/12* (2013.01)

(58) Field of Classification Search
CPC ........... H02K 3/30; H02K 3/32; H02K 3/325; H02K 3/345; H02K 3/46; H02K 3/522
USPC .................................................. 310/154, 215
See application file for complete search history.

(56) References Cited

U.S. PATENT DOCUMENTS

| | | | |
|---|---|---|---|
| 6,975,056 B2 * | 12/2005 | Okada et al. .................. | 310/194 |
| 7,166,949 B2 * | 1/2007 | Okada et al. .................. | 310/194 |
| 8,674,564 B2 * | 3/2014 | Hessenberger et al. ......... | 310/50 |
| 2004/0245882 A1 * | 12/2004 | Horie et al. .................... | 310/194 |
| 2009/0127969 A1 * | 5/2009 | Okuyama et al. ............. | 310/215 |
| 2010/0181863 A1 * | 7/2010 | Murakami et al. ............ | 310/215 |
| 2012/0193969 A1 | 8/2012 | Tso et al. | |

FOREIGN PATENT DOCUMENTS

| | | |
|---|---|---|
| JP | 2003-79080 A | 3/2003 |
| JP | 2004-140964 A | 5/2004 |
| WO | 2012/090424 A1 | 7/2012 |

* cited by examiner

*Primary Examiner* — Terrance Kenerly
*Assistant Examiner* — Rashad Johnson
(74) *Attorney, Agent, or Firm* — Keating & Bennett, LLP

(57) ABSTRACT

An insulator of an armature includes an upper resin member and a lower resin member. Each of the upper and lower resin members includes decreased thickness portions. Axial positions of the decreased thickness portions of the upper and lower resin members are arranged to overlap at least partially with each other. Each of the upper and lower resin members further includes a rib arranged to project from a corresponding one of the decreased thickness portions. The rib improves the strength of the corresponding decreased thickness portion and reduces the likelihood that any of the decreased thickness portions of the upper and lower resin members will be damaged when the two members are fitted to each other.

19 Claims, 10 Drawing Sheets

ARMATURE AND MOTOR

BACKGROUND OF THE INVENTION

1. Field of the Invention

The present invention relates to an armature and more specifically to an armature for use in a motor.

2. Description of the Related Art

JP-A 2003-079080 describes a stator including a stator core, coils, and insulating members, as an example of a conventional armature used in a motor. In the stator described in this publication, each insulating member, which is tubular in shape, is arranged between a separate one of the coils and a corresponding one of magnetic pole teeth of the stator core (see, e.g., claim 1 of JP-A 2003-079080). In addition, each insulating member described in JP-A 2003-079080 is made up of two insulating member pieces joined to each other (see, e.g., claim 3 of JP-A 2003-079080). Moreover, the two insulating member pieces described in JP-A 2003-079080 are fitted to each other such that end portions of the insulating member pieces overlap with each other (see paragraph [0024] and FIG. 3 of JP-A 2003-079080).

In the stator described in JP-A 2003-079080, however, fitting portions of the two insulating member pieces together define an increased thickness portion of the insulating member (see paragraph [0024] and FIG. 3 of JP-A 2003-079080). The increased thickness portion is the thickest portion of the insulating member. According to the above structure, a space in which the coil is to be arranged is narrowed by each increased thickness portion of the insulating member. In order to increase the number of turns of each coil while preventing an excessive increase in the size of the motor, it is desirable to minimize an increase in the thickness of a portion of the insulating member where the two insulating member pieces overlap with each other.

However, simply reducing the thickness of each end portion of each insulating member piece would result in difficulty in ensuring a sufficient strength of each end portion of each insulating member piece. A decrease in the strength of each end portion of each insulating member piece might permit any of the insulating member pieces to be damaged by, for example, contact between the end portions of the insulating member pieces when the two insulating member pieces are fitted to each other. Moreover, a decrease in the thickness of each end portion of each insulating member piece would narrow a channel through which a molten resin flows in a resin molding process. This might lead to a decreased precision in molding.

SUMMARY OF THE INVENTION

Preferred embodiments of the present invention provide a structure of an insulator including a pair of resin members fitted to each other that prevents both damage of each resin member and a decreased precision in molding of each resin member.

According to a preferred embodiment of the present invention, an armature includes an annular core back; a plurality of teeth arranged to extend radially inward or radially outward from the core back; insulators each of which is arranged to cover a separate one of the teeth; and coils, each of which is defined by a conducting wire wound around a separate one of the insulators. Each insulator includes an upper resin member and a lower resin member. The upper resin member includes a top plate portion arranged to cover an upper surface of a corresponding one of the teeth; a pair of upper side wall portions each of which is arranged to extend downward from a separate circumferential end portion of the top plate portion to cover an upper region of a separate one of circumferential side surfaces of the tooth; a pair of first upper decreased thickness portions each of which is arranged to extend further downward from a lower end portion of a separate one of the upper side wall portions, each first upper decreased thickness portion having a circumferential thickness smaller than that of each upper side wall portion; and a first upper rib. The lower resin member includes a bottom plate portion arranged to cover a lower surface of the tooth; a pair of lower side wall portions, each of which is arranged to extend upward from a separate circumferential end portion of the bottom plate portion to cover a lower region of a separate one of the circumferential side surfaces of the tooth; a pair of first lower decreased thickness portions, each of which is arranged to extend further upward from an upper end portion of a separate one of the lower side wall portions, each first lower decreased thickness portion having a circumferential thickness smaller than that of each lower side wall portion; and a first lower rib. An axial position of each of the first upper decreased thickness portions and the first upper rib is arranged to overlap at least partially with an axial position of each of the first lower decreased thickness portions and the first lower rib. The first upper rib is arranged to project in a circumferential direction from a surface of a corresponding one of the first upper decreased thickness portions toward a corresponding one of the first lower decreased thickness portions. The first lower rib is arranged to project in the circumferential direction from a surface of a corresponding one of the first lower decreased thickness portions toward a corresponding one of the first upper decreased thickness portions. Each of the circumferential thickness of each first upper decreased thickness portion and a combined circumferential thickness of the first upper decreased thickness portion and the first upper rib is arranged to decrease with decreasing height or to be uniform. Each of the circumferential thickness of each first lower decreased thickness portion and a combined circumferential thickness of the first lower decreased thickness portion and the first lower rib is arranged to decrease with increasing height or to be uniform. A radial width of the first upper rib is arranged to decrease with decreasing height or to be uniform. A radial width of the first lower rib is arranged to decrease with increasing height or to be uniform.

According to the above preferred embodiment of the present invention, the strength of the first upper decreased thickness portion is significantly improved by the first upper rib. In addition, the strength of the first lower decreased thickness portion is significantly improved by the first lower rib. This reduces the likelihood that any of the first upper decreased thickness portion and the first lower decreased thickness portion will be damaged when the upper and lower resin members are fitted to each other. Moreover, channels through which a molten resin flows in a molding process are expanded by spaces arranged to permit molding of the ribs. This preferably improves precision with which each of the decreased thickness portions is molded.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described with reference to the accompanying drawings. It is assumed herein that a direction parallel or substantially parallel to a central axis of a motor is referred to by the term "axial direction", "axial", or "axially", that directions perpendicular or substantially perpendicular to the central axis of the motor are referred to by the term "radial direction", "radial", or "radially", and that a direction along a circular arc centered on the central axis of the motor is referred to by the term "circumferential direction", "circumferential", or "circumferentially". It is also assumed herein that a vertical direction is the axial direction, and that a side on which a top plate portion of an insulator is arranged with respect to a bottom plate portion of the insulator is defined as an upper side. The shape of each member or portion and relative positions of different members or portions will be described based on the above assumptions. It should be noted, however, that the above definitions of the various directions are simply made for the sake of convenience in description, and should not be construed to restrict in any way the orientation of an armature or a motor according to any preferred embodiment of the present invention when in use.

First Preferred Embodiment

Figure 1:
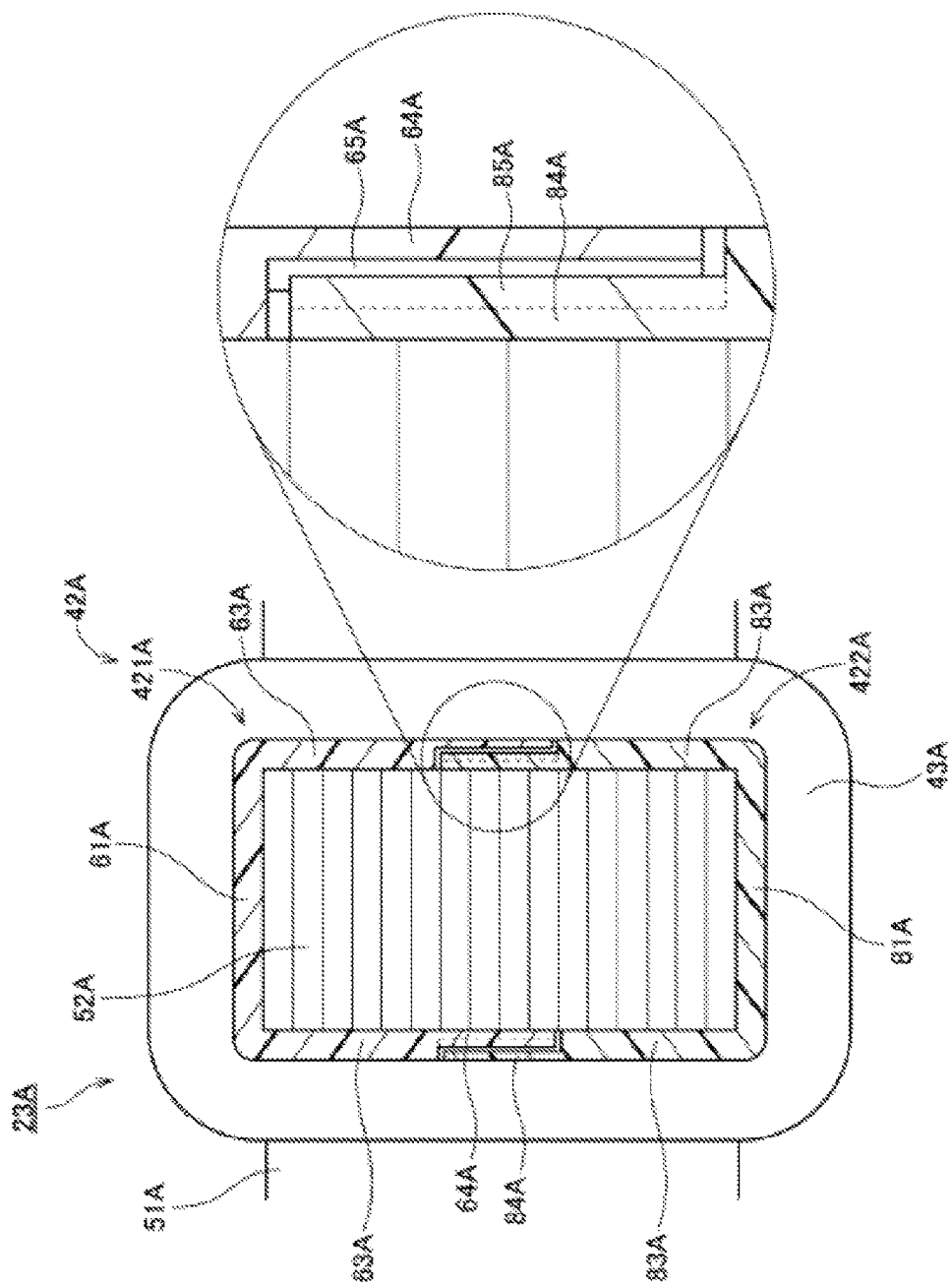
FIG. 1 is a cross-sectional view of an armature according to a first preferred embodiment of the present invention taken along a plane perpendicular to a direction in which one of teeth extends.

FIG. 1 is a cross-sectional view of an armature 23A according to a first preferred embodiment of the present invention taken along a plane perpendicular to a direction in which one of teeth 52A extends. Referring to FIG. 1, the armature 23A preferably includes a core back 51A, the teeth 52A, insulators 42A, and coils 43A.

The core back 51A preferably has an annular shape. The teeth 52A are arranged to extend radially inward from the core back 51A. Note that the teeth 52A may alternatively be arranged to extend radially outward from the core back 51A. An upper surface, a lower surface, and circumferential side surfaces of each of the teeth 52A are preferably covered by a separate one of the insulators 42A. Each of the coils 43A is preferably defined by, for example, a conducting wire wound around a separate one of the insulators 42A.

Each insulator 42A preferably includes an upper resin member 421A and a lower resin member 422A.

The upper resin member 421A preferably includes a top plate portion 61A, a pair of upper side wall portions 63A, and a pair of first upper decreased thickness portions 64A. The upper surface of the tooth 52A is preferably covered by the top plate portion 61A. Each of the upper side wall portions 63A is arranged to extend downward from a separate circumferential end portion of the top plate portion 61A. An upper region of each circumferential side surface of the tooth 52A is preferably covered by a separate one of the upper side wall portions 63A. Each of the pair of first upper decreased thickness portions 64A is arranged to extend further downward from a lower end portion of a separate one of the upper side wall portions 63A. Each first upper decreased thickness portion 64A is preferably arranged to have a circumferential thickness smaller than that of each upper side wall portion 63A.

The lower resin member 422A preferably includes a bottom plate portion 81A, a pair of lower side wall portions 83A, and a pair of first lower decreased thickness portions 84A. The lower surface of the tooth 52A is covered by the bottom plate portion 81A. Each of the lower side wall portions 83A is preferably arranged to extend upward from a separate circumferential end portion of the bottom plate portion 81A. A lower region of each circumferential side surface of the tooth 52A is preferably covered by a separate one of the lower side wall portions 83A. Each of the pair of first lower decreased thickness portions 84A is arranged to extend further upward from an upper end portion of a separate one of the lower side wall portions 83A. Each first lower decreased thickness portion 84A is arranged to have a circumferential thickness smaller than that of each lower side wall portion 83A.

The upper resin member 421A preferably further includes first upper ribs 65A. Each first upper rib 65A is arranged to project in a circumferential direction from a surface of a corresponding one of the first upper decreased thickness portions 64A toward a corresponding one of the first lower decreased thickness portions 84A. In addition, the lower resin member 422A preferably further includes first lower ribs 85A. Each first lower rib 85A is arranged to project in the circumferential direction from a surface of a corresponding one of the first lower decreased thickness portions 84A toward a corresponding one of the first upper decreased thickness portions 64A. An axial position of each of the first upper decreased thickness portions 64A and the first upper ribs 65A is arranged to overlap at least partially with an axial position of each of the first lower decreased thickness portions 84A and the first lower ribs 85A.

Each first upper rib 65A significantly improves the strength of a corresponding one of the first upper decreased thickness portions 64A. Each first lower rib 85A significantly improves the strength of a corresponding one of the first lower decreased thickness portions 84A. This reduces the likelihood that contact between the upper and lower resin members 421A and 422A will cause damage of any of the first upper decreased thickness portions 64A and the first lower decreased thickness portions 84A when the upper and lower resin members 421A and 422A are fitted to each other. In addition, a channel through which a molten resin flows in a molding process is expanded by spaces for molding the ribs 65A and 85A. This improves precision with which each of the decreased thickness portions 64A and 84A is molded.

Moreover, the first upper ribs 65A preferably contribute to preventing each first upper decreased thickness portion 64A from warping because of contraction in the molding process. Similarly, the first lower ribs 85A preferably contribute to preventing each first lower decreased thickness portion 84A from warping because of contraction in the molding process. Prevention of warping of each of the first upper decreased thickness portions 64A and the first lower decreased thickness portions 84A contributes to preventing contact between each first upper decreased thickness portion 64A and a corresponding one of the first lower decreased thickness portions 84A when the upper and lower resin members 421A and 422A are fitted to each other.

Note that each of the circumferential thickness of each first upper decreased thickness portion 64A and the combined circumferential thickness of each first upper decreased thickness portion 64A and each corresponding first upper rib 65A may be arranged either to decrease with decreasing height or to be uniform. Also note that each of the circumferential thickness of each first lower decreased thickness portion 84A and the combined circumferential thickness of each first lower decreased thickness portion 84A and each corresponding first lower rib 85A may be arranged either to decrease with increasing height or to be uniform. Also note that the radial width of each first upper rib 65A may be arranged either to decrease with decreasing height or to be uniform. Also note that the radial width of each first lower rib 85A may be arranged either to decrease with increasing height or to be uniform.

Second Preferred Embodiment

Next, a second preferred embodiment of the present invention will now be described below.

Figure 2:
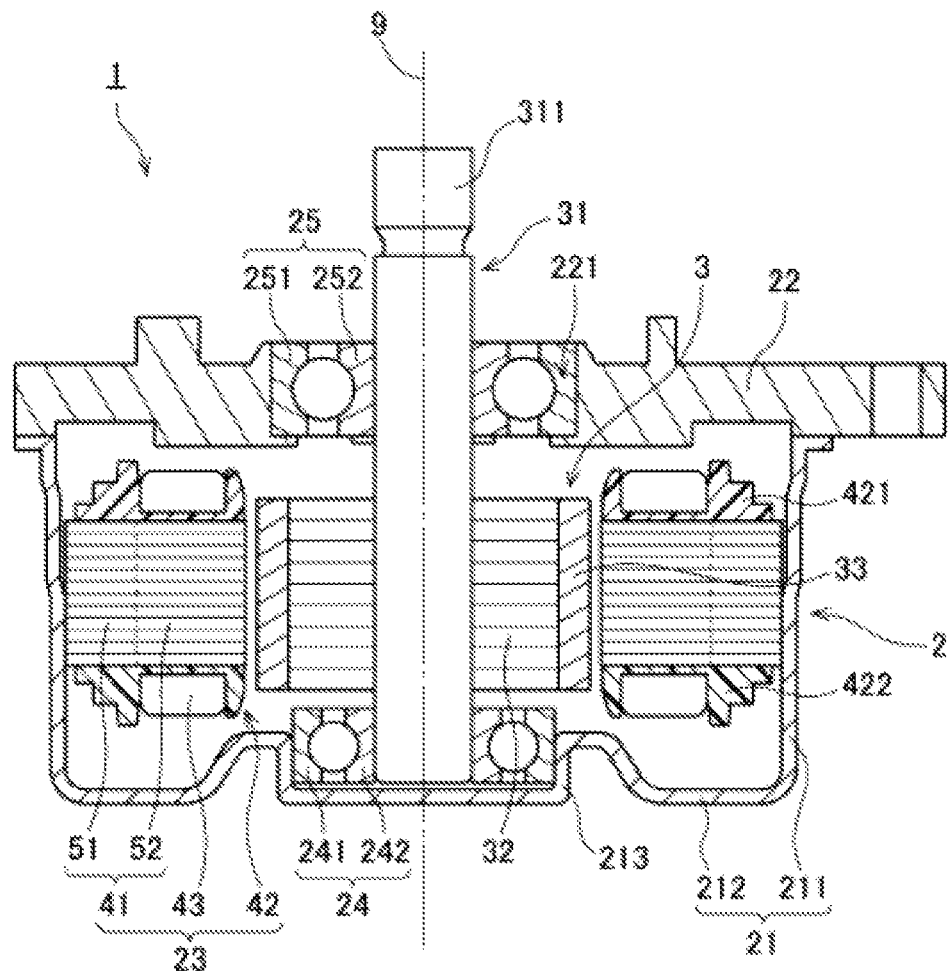
FIG. 2 is a vertical cross-sectional view of a motor according to a second preferred embodiment of the present invention.

FIG. 2 is a vertical cross-sectional view of a motor 1 according to a second preferred embodiment of the present invention. The motor 1 according to the second preferred embodiment is preferably, for example, installed in an automobile and used to produce a driving force for a power steering device. Note, however, that motors according to other preferred embodiments of the present invention may be used for applications other than power steering. For example, a motor according to a preferred embodiment of the present invention may be used as a driving source for another portion of the automobile, e.g., an engine cooling fan. Further, motors according to preferred embodiments of the present invention may be installed in household electrical appliances, office automation appliances, medical appliance, and so on, and may be used to produce a variety of driving forces, for example.

Referring to FIG. 2, the motor 1 includes a stationary portion 2 and a rotating portion 3. The stationary portion 2 is preferably fixed to a frame of an apparatus which the motor 1 is arranged to drive. The rotating portion 3 is supported to be rotatable with respect to the stationary portion 2.

The stationary portion 2 according to the present preferred embodiment preferably includes a housing 21, a cover portion 22, an armature 23, a lower bearing portion 24, and an upper bearing portion 25.

The housing 21 preferably includes a cylindrical side wall 211 and a bottom portion 212 arranged to close a bottom portion of the side wall 211. The cover portion 22 is arranged to cover an upper opening of the housing 21. The armature 23, a rotor core 32, which will be described below, and a plurality of magnets 33, which will be described below, are preferably accommodated in an interior space enclosed by the housing 21 and the cover portion 22. The housing 21 includes a recessed portion 213 defined in a center of the bottom portion 212. The recessed portion 213 is preferably arranged to have the lower bearing portion 24 arranged therein. The cover portion 22 includes a circular hole 221 defined in a center thereof. The circular hole 221 is arranged to have the upper bearing portion 25 arranged therein.

The armature 23 preferably includes a stator core 41, insulators 42, and coils 43. The stator core 41 is preferably defined by laminated steel sheets; however, any other desirable type of stator core could be used instead. The laminated steel sheets are preferably a plurality of electromagnetic steel sheets, which are magnetic bodies, placed one upon another in the axial direction, for example. The stator core 41 preferably includes a core back 51 and a plurality of teeth 52. The core back 51 preferably has an annular shape and is centered on a central axis 9. An outer circumferential surface of the core back 51 is fixed to an inner circumferential surface of the side wall 211 of the housing 21. The teeth 52 are preferably arranged to extend radially inward from the core back 51. In addition, the teeth 52 are arranged at regular intervals in the circumferential direction.

Each insulator 42 preferably includes an upper resin member 421 and a lower resin member 422. Each of the upper and lower resin members 421 and 422 is made of resin, which is an electrically insulating material. The upper and lower resin members 421 and 422 are preferably attached to each of the teeth 52. An upper surface, a lower surface, and both circumferential side surfaces of each tooth 52 are covered by the upper and lower resin members 421 and 422. Each coil 43 is preferably defined by a conducting wire wound around a separate one of the insulators 42. Each insulator 42 is arranged to intervene between a corresponding one of the teeth 52 and a corresponding one of the coils 43 to ensure more secure insulation between the tooth 52 and the coil 43.

The lower bearing portion 24 is preferably arranged between the housing 21 and a shaft 31, which is included in the rotating portion 3. The upper bearing portion 25 is arranged between the cover portion 22 and the shaft 31. A ball bearing, in which an outer race and an inner race are caused to rotate relative to each other through a plurality of balls arranged therebetween, is used as each of the lower and upper bearing portions 24 and 25 according to the present preferred embodiment. Note, however, that a bearing of another type, such as, for example, a plain bearing, a fluid bearing, etc. may be used instead of the ball bearing.

An outer race 241 of the lower bearing portion 24 is preferably arranged in the recessed portion 213 of the housing 21 and fixed to the housing 21. An outer race 251 of the upper bearing portion 25 is preferably arranged in the circular hole 221 of the cover portion 22 and fixed to the cover portion 22. Meanwhile, inner races 242 and 252 of the lower and upper bearing portions 24 and 25, respectively, are fixed to the shaft 31. The shaft 31 is thus supported to be rotatable with respect to the housing 21 and the cover portion 22.

The rotating portion 3 according to the present preferred embodiment preferably includes the shaft 31, the rotor core 32, and the magnets 33.

The shaft 31 preferably is a columnar metallic member arranged to extend along the central axis 9. The shaft 31 is arranged to rotate about the central axis 9 while being supported by the above-described lower and upper bearing portions 24 and 25. The shaft 31 preferably includes a head portion 311 arranged to project upwardly of the cover portion 22. The head portion 311 is, for example, connected to a steering system of an automobile or the like through a power transmission mechanism, such as, for example, a gear.

The rotor core 32 and the magnets 33 are arranged radially inside the armature 23, and are arranged to rotate together with the shaft 31. The rotor core 32 preferably is a cylindrical member fixed to the shaft 31. The magnets 33 are fixed to an outer circumferential surface of the rotor core 32 through an adhesive, for example. A radially outer surface of each magnet 33 defines a pole surface which is to be opposed to a radially inner end surface of each tooth 52. The magnets 33 are preferably arranged at regular intervals in the circumferential direction such that north and south pole surfaces alternate with each other.

Note that a single annular magnet including north and south poles arranged to alternate with each other in the circumferential direction may alternatively be used in place of the plurality of magnets 33, if so desired.

The armature 23 and the magnets 33 are supported to be rotatable relative to each other about the central axis 9. Once drive currents are supplied to the coils 43 of the armature 23, radial magnetic flux is generated around each of the teeth 52 of the stator core 41, and a circumferential torque is produced by interaction between the magnetic flux of the teeth 52 and the magnetic flux of the magnets 33, so that the rotating portion 3 is caused to rotate about the central axis 9 with respect to the stationary portion 2.

Figure 3:
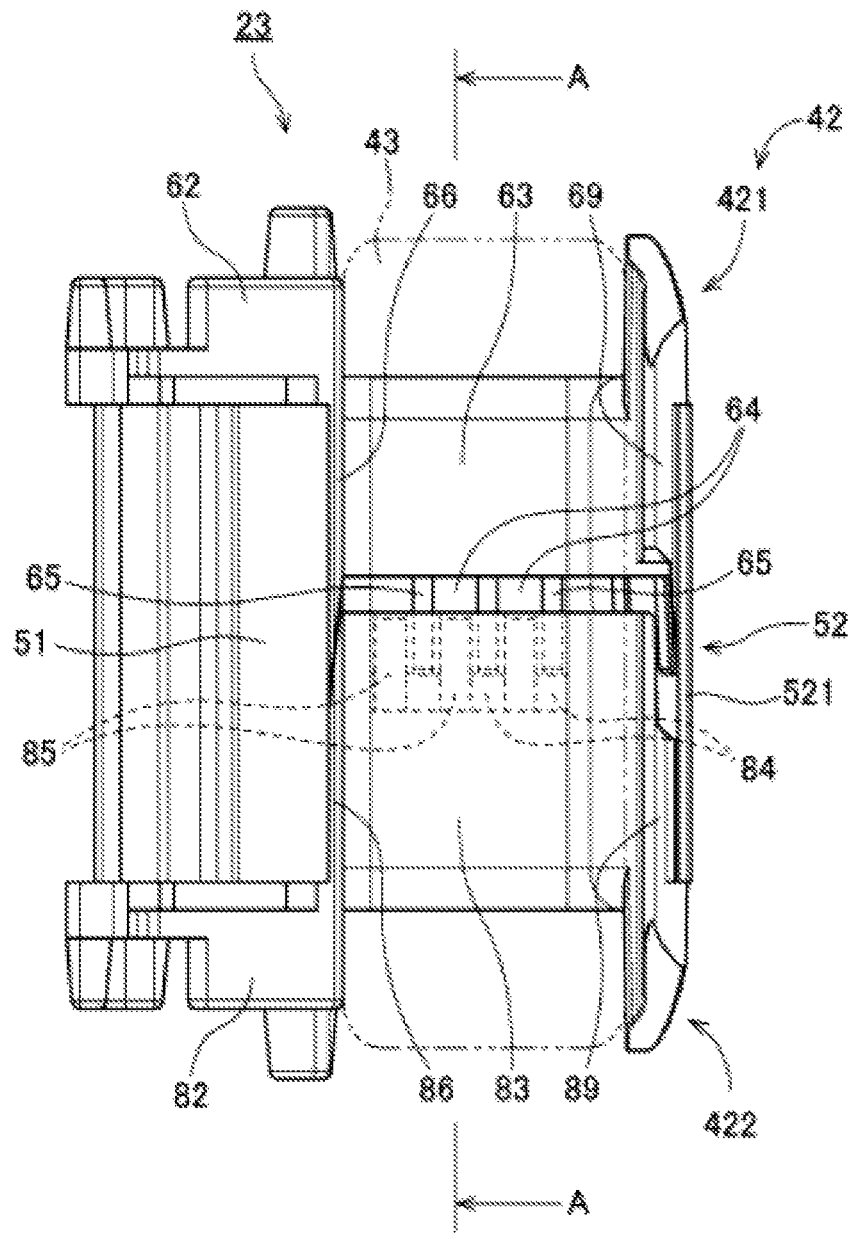
FIG. 3 is a side view of a tooth and an insulator according to the second preferred embodiment of the present invention.
Figure 4:
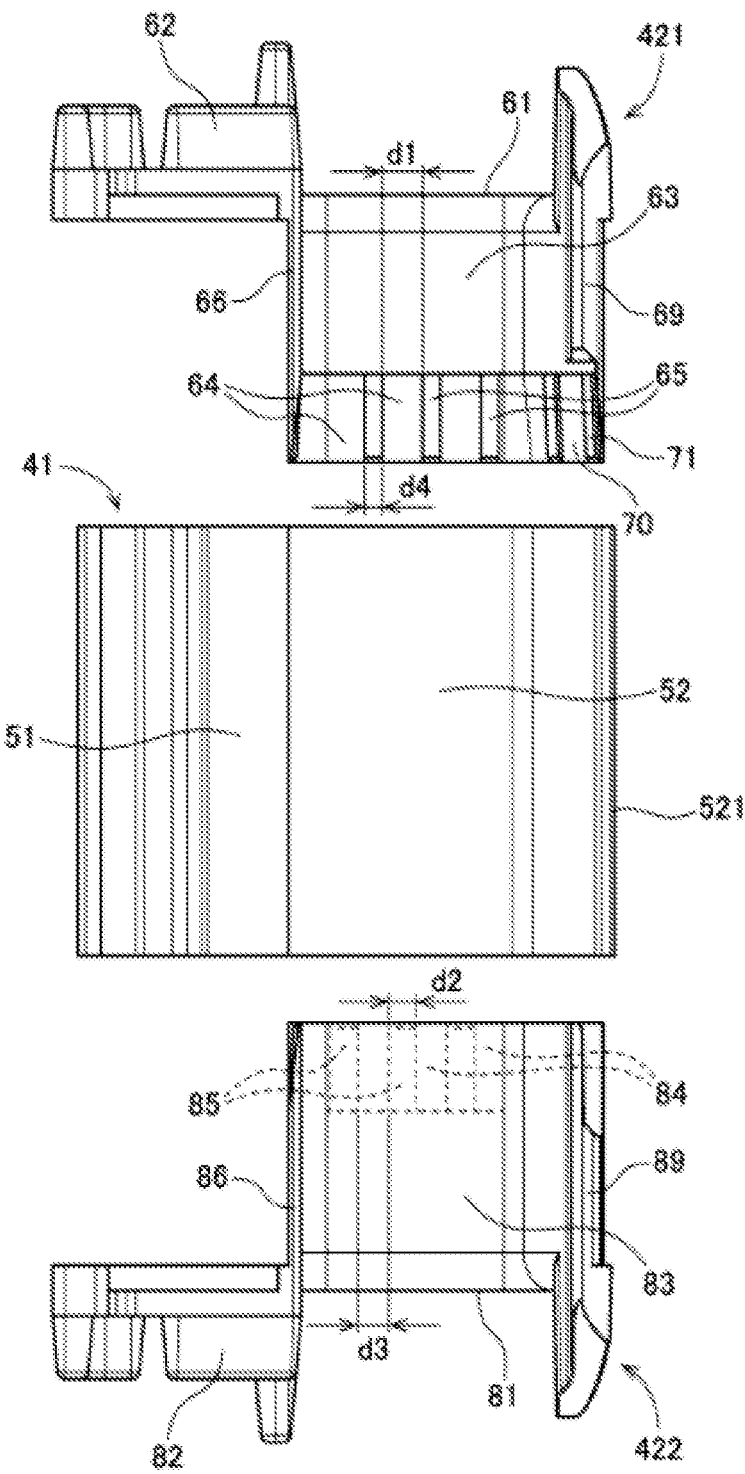
FIG. 4 is an exploded view of the tooth, an upper resin member and a lower resin member according to the second preferred embodiment of the present invention.
Figure 5:
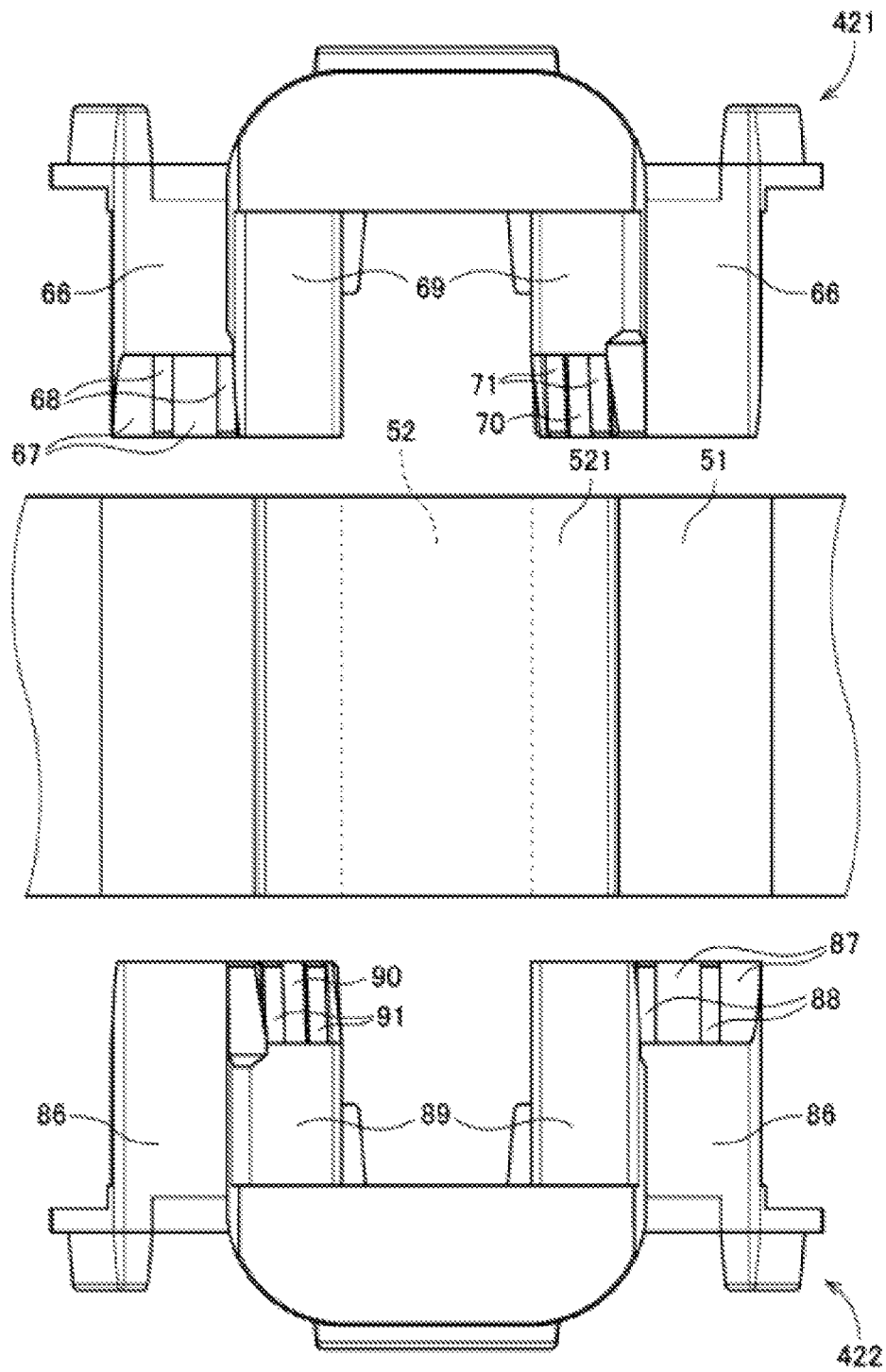
FIG. 5 is an exploded view of the tooth, the upper resin member, and the lower resin member according to the second preferred embodiment of the present invention.

Next, the detailed structure of the insulator 42 will now be described below. FIG. 3 is a side view of the tooth 52 and the insulator 42 as viewed from a circumferential side. FIG. 4 is an exploded view of the tooth 52 and the upper and lower resin members 421 and 422 as viewed from the circumferential side. FIG. 5 is an exploded view of the tooth 52 and the upper and lower resin members 421 and 422 as viewed from radially inside.

Referring to FIGS. 3 to 5, a radially inner tip portion 521 of each tooth 52 is arranged to extend radially out beyond both circumferential sides of the tooth 52. That is, the circumferential width of the tip portion 521 is greater than the circumferential width of a remaining portion of the tooth 52. A radially inner surface of the tip portion 521 is arranged to be radially opposed to each magnet 33. As represented by a chain double-dashed line in FIG. 3, the coil 43 is preferably arranged radially inward of the core back 51 and radially outward of the tip portion 521 of the tooth 52.

Figure 6:
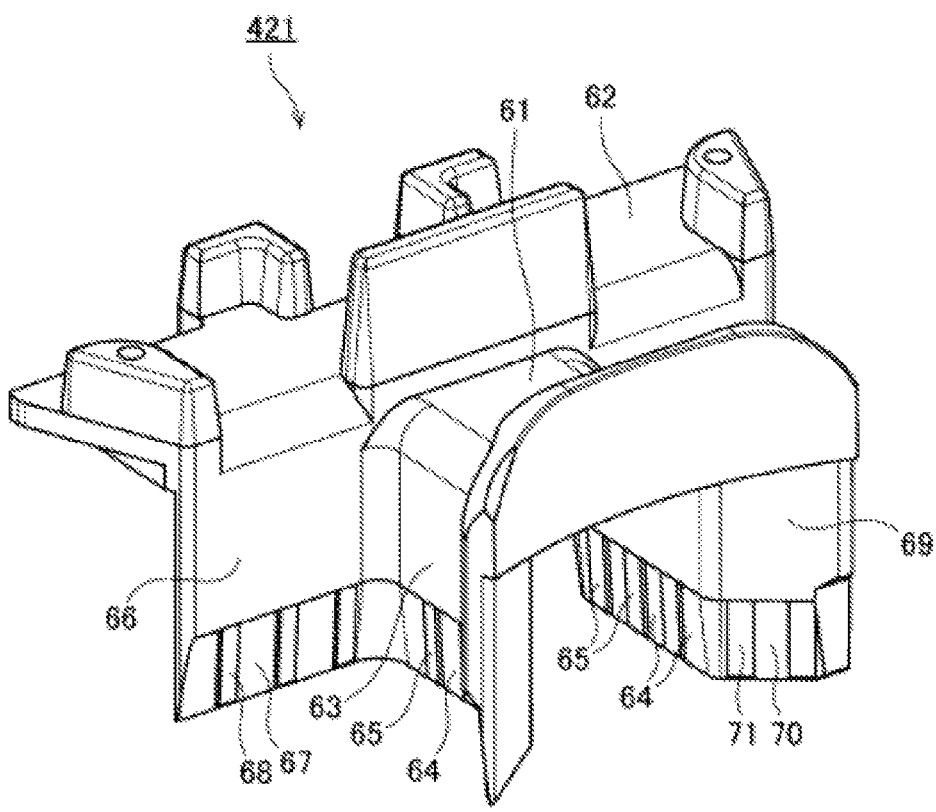
FIG. 6 is a perspective view of the upper resin member according to the second preferred embodiment of the present invention.

FIG. 6 is a perspective view of the upper resin member 421. Referring to FIGS. 3 to 6, the upper resin member 421 preferably includes a first top plate portion 61, a second top plate portion 62, a pair of upper side wall portions 63, a pair of first upper decreased thickness portions 64, a plurality of first upper ribs 65, an upper outer wall portion 66, a pair of second upper decreased thickness portions 67, a plurality of second upper ribs 68, a pair of upper inner wall portions 69, a pair of third upper decreased thickness portions 70, and a plurality of third upper ribs 71.

The first top plate portion 61 is arranged above the tooth 52. The first top plate portion 61 is arranged to join upper end portions of the pair of upper side wall portions 63 to each other in the circumferential direction. The upper surface of the tooth 52 is covered by the first top plate portion 61. The second top plate portion 62 is arranged above the core back 51. The second top plate portion 62 is arranged to extend radially outward from an upper end portion of the upper outer wall portion 66. A portion of an upper surface of the core back 51 is covered by the second top plate portion 62.

Each of the pair of upper side wall portions 63 is arranged to extend downward from a separate circumferential end portion of the first top plate portion 61. An upper region of each circumferential side surface of the tooth 52 is covered by a separate one of the upper side wall portions 63. Each of the pair of first upper decreased thickness portions 64 is arranged to extend further downward from a lower end portion of a separate one of the pair of upper side wall portions 63. Each first upper decreased thickness portion 64 is arranged to have a circumferential thickness smaller than that of each upper side wall portion 63. In addition, the circumferential thickness of each first upper decreased thickness portion 64 is arranged to decrease with decreasing height.

Each of the plurality of first upper ribs 65 is arranged to project in the circumferential direction from a surface of a corresponding one of the first upper decreased thickness portions 64 toward a corresponding one of a pair of first lower decreased thickness portions 84, which will be described below. The first upper ribs 65 are preferably arranged at regular intervals in a radial direction. In addition, each first upper rib 65 is arranged to extend in the axial direction from a location corresponding to an upper end portion of each first upper decreased thickness portion 64 to a location corresponding to a lower end portion of each first upper decreased thickness portion 64. Each first upper rib 65 significantly improves the rigidity of a corresponding one of the first upper decreased thickness portions 64. In particular, each first upper rib 65 significantly increases the strength of the corresponding first upper decreased thickness portion 64 against circumferential deformation.

The upper outer wall portion 66 is arranged to extend downward from a radially inner end portion of the second top plate portion 62. An upper region of a portion of a radially inner surface of the core back 51 is covered by the upper outer wall portion 66. Each of the pair of second upper decreased thickness portions 67 is arranged to extend further downward from a lower end portion of the upper outer wall portion 66. Each second upper decreased thickness portion 67 is arranged to have a radial thickness smaller than that of the upper outer wall portion 66. In addition, the radial thickness of each second upper decreased thickness portion 67 is preferably arranged to decrease with decreasing height.

Each of the plurality of second upper ribs 68 is arranged to project in the radial direction from a surface of a corresponding one of the second upper decreased thickness portions 67 toward a corresponding one of a pair of second lower decreased thickness portions 87, which will be described below. The second upper ribs 68 are arranged at regular intervals in the circumferential direction. In addition, each second upper rib 68 is arranged to extend in the axial direction from a location corresponding to an upper end portion of each second upper decreased thickness portion 67 to a location corresponding to a lower end portion of each second upper decreased thickness portion 67. Each second upper rib 68 significantly improves the rigidity of a corresponding one of the second upper decreased thickness portions 67. In particular, each second upper rib 68 significantly increases strength of the corresponding second upper decreased thickness portion 67 against radial deformation.

Each of the upper inner wall portions 69 is arranged to extend in the circumferential direction from a radially inner end portion of a separate one of the upper side wall portions 63. An upper region of each of radially outer surfaces of the tip portion 521 of the tooth 52 is covered by a separate one of the upper inner wall portions 69. Each of the pair of third upper decreased thickness portions 70 is arranged to extend further downward from a lower end portion of a separate one of the upper inner wall portions 69. Each third upper decreased thickness portion 70 is arranged to have a radial thickness smaller than that of each upper inner wall portion 69. In addition, the radial thickness of each third upper decreased thickness portion 70 is arranged to decrease with decreasing height.

Each of the plurality of third upper ribs 71 is arranged to project in the radial direction from a surface of a corresponding one of the third upper decreased thickness portions 70 toward a corresponding one of a pair of third lower decreased thickness portions 90, which will be described below. The third upper ribs 71 are preferably arranged at regular intervals in the circumferential direction. In addition, each third upper rib 71 is arranged to extend in the axial direction from a location corresponding to an upper end portion of each third upper decreased thickness portion 70 to a location corresponding to a lower end portion of each third upper decreased thickness portion 70. Each third upper rib 71 significantly improves the rigidity of a corresponding one of the third upper decreased thickness portions 70. In particular, each third upper rib 71 significantly increases the strength of the corresponding third upper decreased thickness portion 70 against radial deformation.

Referring to FIGS. 3 to 5, the lower resin member 422 preferably includes a first bottom plate portion 81, a second bottom plate portion 82, a pair of lower side wall portions 83, the pair of first lower decreased thickness portions 84, a plurality of first lower ribs 85, a lower outer wall portion 86, the pair of second lower decreased thickness portions 87, a plurality of second lower ribs 88, a pair of lower inner wall portions 89, the pair of third lower decreased thickness portions 90, and a plurality of third lower ribs 91.

The first bottom plate portion 81 is arranged below the tooth 52. The first bottom plate portion 81 is arranged to join lower end portions of the pair of lower side wall portions 83 to each other in the circumferential direction. The lower surface of the tooth 52 is covered by the first bottom plate portion 81. The second bottom plate portion 82 is arranged below the core back 51. The second bottom plate portion 82 is arranged to extend radially outward from a lower end portion of the lower outer wall portion 86. A portion of a lower surface of the core back 51 is covered by the second bottom plate portion 82.

Each of the pair of lower side wall portions 83 is arranged to extend upward from a separate circumferential end portion of the first bottom plate portion 81. A lower region of each circumferential side surface of the tooth 52 is covered by a separate one of the lower side wall portions 83. Each of the pair of first lower decreased thickness portions 84 is arranged to extend further upward from an upper end portion of a separate one of the pair of lower side wall portions 83. Each first lower decreased thickness portion 84 is arranged to have a circumferential thickness smaller than that of each lower side wall portion 83. In addition, the circumferential thickness of each first lower decreased thickness portion 84 is preferably arranged to decrease with increasing height.

Each of the plurality of first lower ribs 85 is arranged to project in the circumferential direction from a surface of a corresponding one of the first lower decreased thickness portions 84 toward a corresponding one of the first upper decreased thickness portions 64. The first lower ribs 85 are arranged at regular intervals in the radial direction. In addition, each first lower rib 85 is arranged to extend in the axial direction from a location corresponding to a lower end portion of each first lower decreased thickness portion 84 to a location corresponding to an upper end portion of each first lower decreased thickness portion 84. Each first lower rib 85 significantly improves the rigidity of a corresponding one of the first lower decreased thickness portions 84. In particular, each first lower rib 85 significantly increases the strength of the corresponding first lower decreased thickness portion 84 against circumferential deformation.

The lower outer wall portion 86 is arranged to extend upward from a radially inner end portion of the second bottom plate portion 82. A lower region of a portion of the radially inner surface of the core back 51 is covered by the lower outer wall portion 86. Each of the pair of second lower decreased thickness portions 87 is arranged to extend further upward from an upper end portion of the lower outer wall portion 86. Each second lower decreased thickness portion 87 is arranged to have a radial thickness smaller than that of the lower outer wall portion 86. In addition, the radial thickness of each second lower decreased thickness portion 87 is arranged to decrease with increasing height.

Each of the plurality of second lower ribs 88 is arranged to project in the radial direction from a surface of a corresponding one of the second lower decreased thickness portions 87 toward a corresponding one of the second upper decreased thickness portions 67. The second lower ribs 88 are preferably arranged at regular intervals in the circumferential direction. In addition, each second lower rib 88 is arranged to extend in the axial direction from a location corresponding to a lower end portion of each second lower decreased thickness portion 87 to a location corresponding to an upper end portion of each second lower decreased thickness portion 87. Each second lower rib 88 significantly improves the rigidity of a corresponding one of the second lower decreased thickness portions 87. In particular, each second lower rib 88 significantly increases the strength of the corresponding second lower decreased thickness portion 87 against radial deformation.

Each of the lower inner wall portions 89 is arranged to extend in the circumferential direction from a radially inner end portion of a separate one of the lower side wall portions 83. A lower region of each radially outer surface of the tip portion 521 of the tooth 52 is preferably covered by a separate one of the lower inner wall portions 89. Each of the pair of third lower decreased thickness portions 90 is arranged to extend further upward from an upper end portion of a separate one of the lower inner wall portions 89. Each third lower decreased thickness portion 90 is arranged to have a radial thickness smaller than that of each lower inner wall portion 89. In addition, the radial thickness of each third lower decreased thickness portion 90 is arranged to decrease with increasing height.

Each of the plurality of third lower ribs 91 is arranged to project in the radial direction from a surface of a corresponding one of the third lower decreased thickness portions 90 toward a corresponding one of the third upper decreased thickness portions 70. The third lower ribs 91 are preferably arranged at regular intervals in the circumferential direction. In addition, each third lower rib 91 is arranged to extend in the axial direction from a location corresponding to a lower end portion of each third lower decreased thickness portion 90 to a location corresponding to an upper end portion of each third lower decreased thickness portion 90. Each third lower rib 91 significantly improves the rigidity of a corresponding one of the third lower decreased thickness portions 90. In particular, each third lower rib 91 significantly increases the strength of the corresponding third lower decreased thickness portion 90 against radial deformation.

The axial position of each of the pair of first upper decreased thickness portions 64 and the plurality of first upper ribs 65 is arranged to overlap at least partially with the axial position of each of the pair of first lower decreased thickness portions 84 and the plurality of first lower ribs 85. This arrangement prevents contact between each circumferential side surface of the tooth 52 and the coil 43. In addition, the axial position of each of the pair of second upper decreased thickness portions 67 and the plurality of second upper ribs 68 is arranged to overlap at least partially with the axial position of each of the pair of second lower decreased thickness portions and the plurality of second lower ribs 88. This prevents contact between the core back 51 and the coil 43.

In addition, the axial position of each of the pair of third upper decreased thickness portions 70 and the plurality of third upper ribs 71 is arranged to overlap at least partially with the axial position of each of the pair of third lower decreased thickness portions 90 and the plurality of third lower ribs 91. This prevents contact between the tip portion 521 of the tooth 52 and the coil 43. Electrical insulation between the stator core 41 and the coil 43 is thereby ensured.

As described above, the rigidity of the first, second, and third upper decreased thickness portions 64, 67, and 70 is increased by the first, second, and third upper ribs 65, 68, and 71, respectively. In addition, the rigidity of the first, second, and third lower decreased thickness portions 84, 87, and 90 is increased by the first, second, and third lower ribs 85, 88, and 91, respectively. This reduces the likelihood that contact between the upper and lower resin members 421 and 422 will cause damage to any of the first, second, and third upper decreased thickness portions 64, 67, and 70 and the first, second, and third lower decreased thickness portions 84, 87, and 90 when the upper and lower resin members 421 and 422 are fitted to each other.

Each of the upper and lower resin members 421 and 422 is preferably obtained by, for example, a resin injection molding process. Channels through which a molten resin flows in the injection molding process are expanded by spaces used in molding the first, second, and third upper ribs 65, 68, and 71 and spaces used in molding the first, second, and third lower ribs 85, 88, and 91. This improves precision with which each of the first, second, and third upper decreased thickness portions 64, 67, and 70 and the first, second, and third lower decreased thickness portions 84, 87, and 90 is molded.

In addition, the first, second, and third upper ribs 65, 68, and 71 and the first, second, and third lower ribs 85, 88, and 91 contribute to preventing the first, second, and third upper decreased thickness portions 64, 67, and 70 and the first, second, and third lower decreased thickness portions 84, 87, and 90, respectively, from warping because of contraction in the injection molding process. Prevention of warping of each of the first, second, and third upper decreased thickness portions 64, 67, and 70 and the first, second, and third lower decreased thickness portions 84, 87, and 90 preferably contributes to preventing contact between the first upper decreased thickness portions 64 and the first lower decreased thickness portions 84, contact between the second upper decreased thickness portions 67 and the second lower decreased thickness portions 87, and contact between the third upper decreased thickness portions 70 and the third lower decreased thickness portions 90 when the upper and lower resin members 421 and 422 are fitted to each other.

Moreover, the first upper ribs 65 and the first lower ribs 85 of the insulator 42 are not circumferentially opposed to each other. Each first upper rib 65 is circumferentially opposed to a corresponding one of the first lower decreased thickness portions 84. Meanwhile, each first lower rib 85 is circumferentially opposed to a corresponding one of the first upper decreased thickness portions 64. The circumferential position of each of the plurality of first upper ribs 65 and the circumferential position of each of the plurality of first lower ribs 85 are arranged to overlap with each other. That is, the first upper ribs 65 and the first lower ribs 85 are arranged radially adjacent to each other. This leads to a reduction in the overall circumferential thickness of each first upper decreased thickness portion 64, each corresponding first upper rib 65, the corresponding first lower decreased thickness portion 84, and each corresponding first lower rib 85. A wider space is thereby secured for the coil 43.

Furthermore, the second upper ribs 68 and the second lower ribs 88 of the insulator 42 are not radially opposed to each other. Each second upper rib 68 is radially opposed to a corresponding one of the second lower decreased thickness portions 87. Meanwhile, each second lower rib 88 is radially opposed to a corresponding one of the second upper decreased thickness portions 67. The radial position of each of the plurality of second upper ribs 68 and the radial position of each of the plurality of second lower ribs 88 are arranged to overlap with each other. That is, the second upper ribs 68 and the second lower ribs 88 are arranged circumferentially adjacent to each other. This leads to a reduction in the overall radial thickness of each second upper decreased thickness portion 67, each corresponding second upper rib 68, the corresponding second lower decreased thickness portion 87, and each corresponding second lower rib 88. A still wider space is thereby preferably secured for the coil 43.

Furthermore, the third upper ribs 71 and the third lower ribs 91 of the insulator 42 are not radially opposed to each other. Each third upper rib 71 is radially opposed to a corresponding one of the third lower decreased thickness portions 90. Meanwhile, each third lower rib 91 is radially opposed to a corresponding one of the third upper decreased thickness portions 70. The radial position of each of the plurality of third upper ribs 71 and the radial position of each of the plurality of third lower ribs 91 are preferably arranged to overlap with each other. That is, the third upper ribs 71 and the third lower ribs 91 are arranged circumferentially adjacent to each other. This leads to a reduction in the overall radial thickness of each third upper decreased thickness portion 70, each corresponding third upper rib 71, the corresponding third lower decreased thickness portion 90, and each corresponding third lower rib 91. A still wider space is thereby secured for the coil 43.

Each of the number of first upper ribs 65, the number of second upper ribs 68, and the number of third upper ribs 71 included in the upper resin member 421 according to the present preferred embodiment is preferably more than one. This contributes to reducing unevenness in the strength of each of the first, second, and third upper decreased thickness portions 64, 67, and 70. Moreover, the channel through which the molten resin flows in the molding process is preferably further expanded by the plurality of each of the first upper ribs 65, the second upper ribs 68, and the third upper ribs 71. This improves the precision with which each of the first, second, and third upper decreased thickness portions 64, 67, and 70 is molded.

Each of the number of first lower ribs 85, the number of second lower ribs 88, and the number of third lower ribs 91 inclined in the lower resin member 422 according to the present preferred embodiment is preferably more than one. This contributes to reducing unevenness in the strength of each of the first, second, and third lower decreased thickness portions 84, 87, and 90. Moreover, the channel through which the molten resin flows in the molding process is further expanded by the plurality of each of the first lower ribs 85, the second lower ribs 88, and the third lower ribs 91. This improves the precision with which each of the first, second, and third lower decreased thickness portions 84, 87, and 90 is molded.

Referring to FIG. 4, the radial interval d1 between adjacent ones of the plurality of first upper ribs 65 is preferably arranged to be greater than the radial dimension d2 of each individual first lower rib 85. In addition, the radial interval d3 between adjacent ones of the plurality of first lower ribs 85 is preferably arranged to be greater than the radial dimension d4 of each individual first upper rib 65. Similarly, the circumferential interval between adjacent ones of the plurality of second upper ribs 68 is arranged to be greater than the circumferential dimension of each individual second lower rib 88. In addition, the circumferential interval between adjacent ones of the plurality of second lower ribs 88 is preferably arranged to be greater than the circumferential dimension of each individual second upper rib 68. Similarly, the circumferential interval between adjacent ones of the third upper ribs 71 is preferably arranged to be greater than the circumferential dimension of each individual third lower rib 91. In addition, the circumferential interval between adjacent ones of the third lower ribs 91 is arranged to be greater than the circumferential dimension of each individual third upper rib 71. It is therefore possible to fit the upper and lower resin members 421 and 422 to each other without interference therebetween.

Each rib projecting from one of each first upper decreased thickness portion 64 and the corresponding first lower decreased thickness portion 84 which is closer to the coil 43 is preferably arranged to have a radial width greater than that of each rib projecting from the other decreased thickness portion. In the case of FIG. 4, for example, the dimension d2 is preferably arranged to be greater than the dimension d4. This reduces the likelihood that the decreased thickness portion that is closer to the coil 43 will tilt toward the tooth 52. This contributes to more securely preventing contact between the first upper decreased thickness portion 64 and the first lower decreased thickness portion 84.

Similarly, each rib projecting from one of each second upper decreased thickness portion 67 and the corresponding second lower decreased thickness portion 87 which is closer to the coil 43 is preferably arranged to have a circumferential width greater than that of each rib projecting from the other decreased thickness portion. Moreover, each rib projecting from one of each third upper decreased thickness portion 70 and the corresponding third lower decreased thickness portion 90 which is closer to the coil 43 is preferably arranged to have a circumferential width greater than that of each rib projecting from the other decreased thickness portion.

Figure 7:
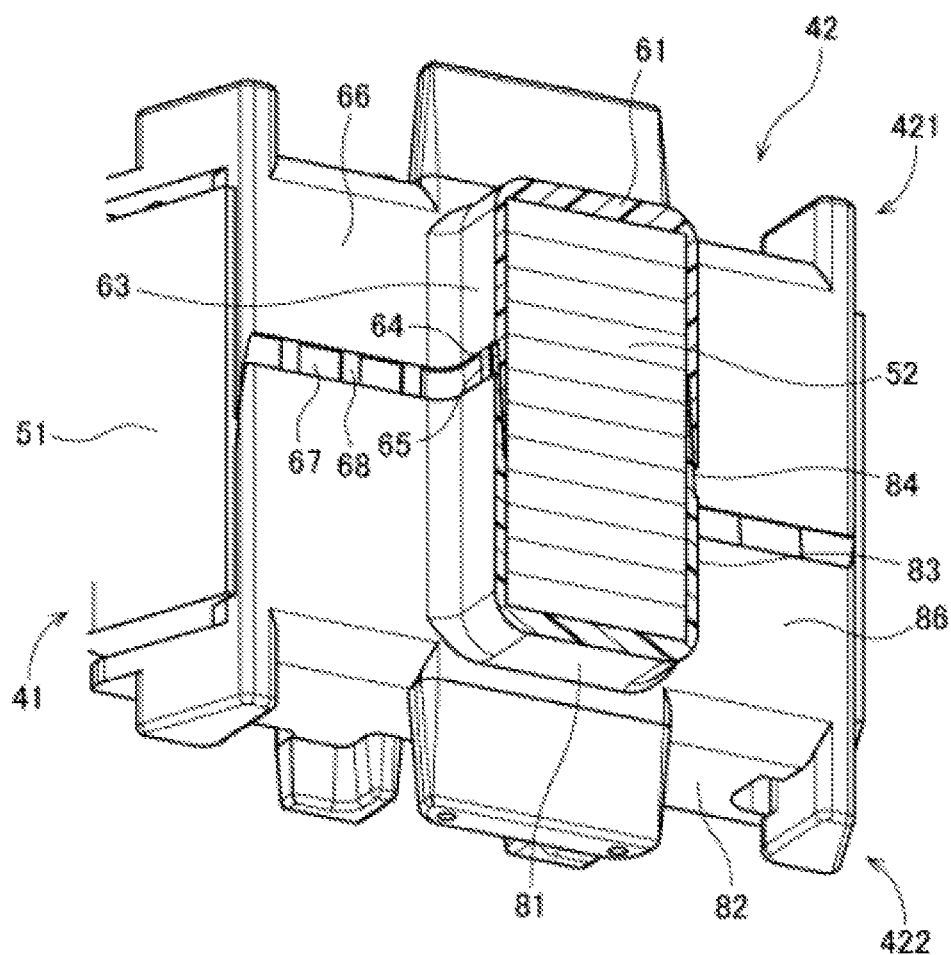
FIG. 7 is a partial perspective view of a stator core and the insulator according to the second preferred embodiment of the present invention.
Figure 8:
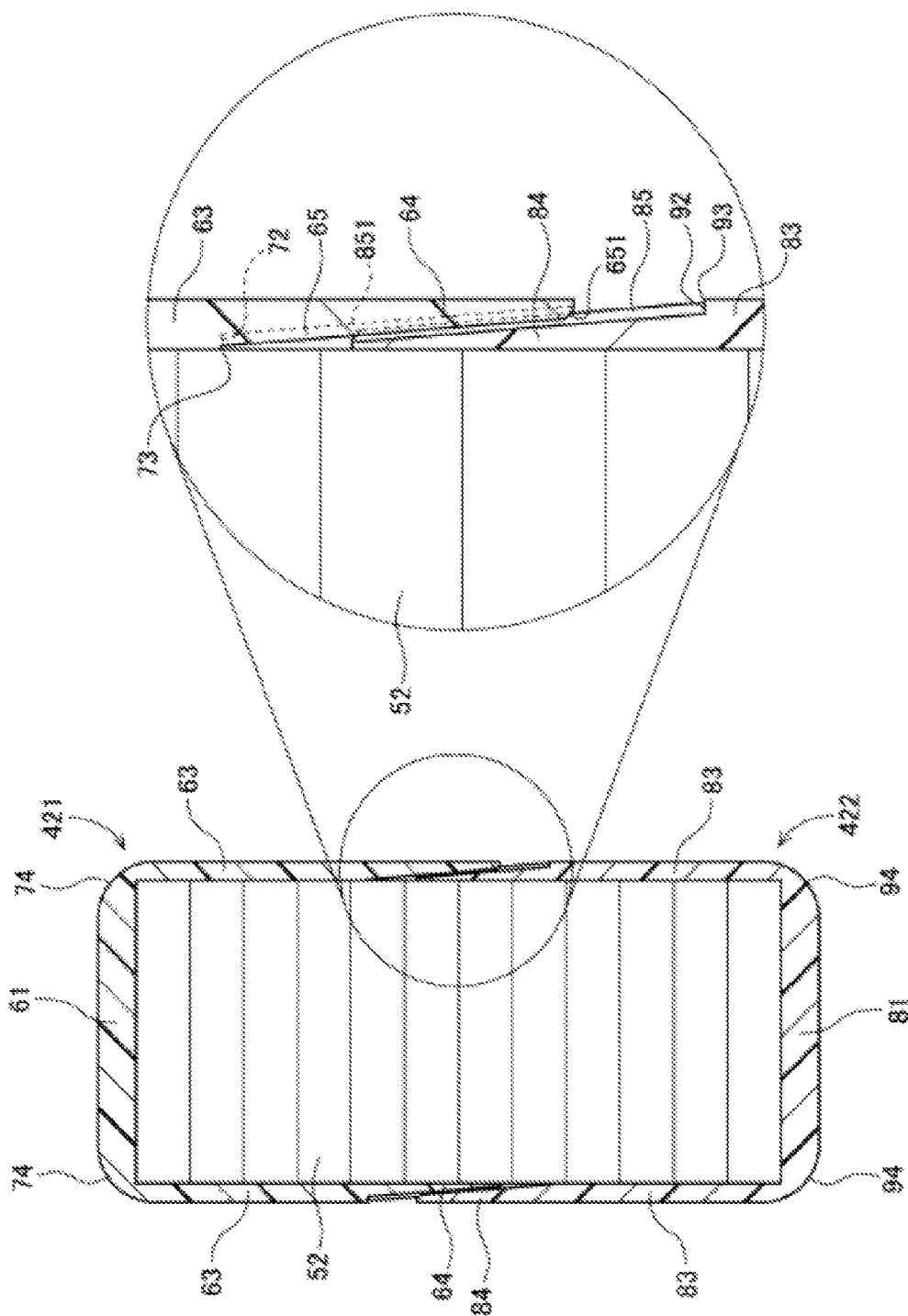
FIG. 8 is a cross-sectional view of the tooth and the insulator according to the second preferred embodiment of the present invention taken along a plane perpendicular to a direction in which the tooth extends.

FIG. 7 is a partial perspective view of the stator core 41 and the insulator 42. In FIG. 7, each of the tooth 52 and the insulator 42 is cut away. FIG. 8 is a cross-sectional view of the tooth 52 and the insulator 42 taken along a plane perpendicular to a direction in which the tooth 52 extends. Both a cut-out section of FIG. 7 and a vertical section of FIG. 8 are taken along line A-A in FIG. 3. FIG. 8 also illustrates an area including one of the first upper decreased thickness portions 64, one of the first upper ribs 65, one of the first lower decreased thickness portions 84, and one of the first lower ribs 85, and its vicinity in an enlarged form.

Referring to FIGS. 7 and 8, in the present preferred embodiment, one of the pair of first lower decreased thickness portions 84 arranged on both circumferential sides of the tooth 52 is arranged between the tooth 52 and one of the pair of first upper decreased thickness portions 64 arranged on both circumferential sides of the tooth 52. In addition, the other one of the pair of first upper decreased thickness portions 64 arranged on both circumferential sides of the tooth 52 is arranged between the tooth 52 and the other one of the first lower decreased thickness portions 84 arranged on both circumferential sides of the tooth 52.

This enables each of the upper and lower resin members 421 and 422 to have the same shape. This in turn makes it possible to preferably mold each of the upper and lower resin members 421 and 422 using the same mold, for example. This makes it possible to produce the upper and lower resin members 421 and 422 at a lower cost and efficiently. Moreover, one of the two decreased thickness portions of each resin member is spaced from the tooth 52. This enables each resin member to be fitted to the tooth 52 with greater ease.

Each of the decreased thickness portions and the ribs is preferably arranged to have a shape so as to facilitate a mold release from the mold in the injection molding process. For example, each of the circumferential thickness of each first upper decreased thickness portion 64 and the combined circumferential thickness of each first upper decreased thickness portion 64 and each corresponding first upper rib 65 is preferably arranged to decrease with decreasing height or to be uniform. Moreover, the radial width of each first upper rib 65 is preferably arranged to decrease with decreasing height or to be uniform.

Similarly, each of the radial thickness of each second upper decreased thickness portion 67 and the combined radial thickness of each second upper decreased thickness portion 67 and each corresponding second upper rib 68 is preferably arranged to decrease with decreasing height or to be uniform. Moreover, each of the radial thickness of each third upper decreased thickness portion 70 and the combined radial thickness of each third upper decreased thickness portion 70 and each corresponding third upper rib 71 is preferably arranged to decrease with decreasing height or to be uniform. Furthermore, the circumferential width of each of the second and third upper ribs 68 and 71 is preferably arranged to decrease with decreasing height or to be uniform.

Meanwhile, each of the circumferential thickness of each first lower decreased thickness portion 84 and the combined circumferential thickness of each first lower decreased thickness portion 84 and each corresponding first lower rib 85 is preferably arranged to decrease with increasing height or to be uniform. Moreover, the radial width of each first lower rib 85 is preferably arranged to decrease with increasing height or to be uniform.

Moreover, each of the radial thickness of each second lower decreased thickness portion 87 and the combined radial thickness of each second lower decreased thickness portion 87 and each corresponding second lower rib 88 is preferably arranged to decrease with increasing height or to be uniform. Furthermore, each of the radial thickness of each third lower decreased thickness portion 90 and the combined radial thickness of each third lower decreased thickness portion 90 and each corresponding third lower rib 91 is preferably arranged to decrease with increasing height or to be uniform. Furthermore, the circumferential width of each of the second and third lower ribs 88 and 91 is preferably arranged to decrease with increasing height or to be uniform.

According to the present preferred embodiment, the thickness of each decreased thickness portion is arranged to gradually decrease toward a tip thereof. Moreover, the combined thickness of each decreased thickness portion and each corresponding rib is also arranged to gradually decrease toward tips thereof. In addition, each upper decreased thickness portion and each corresponding upper rib, and the corresponding lower decreased thickness portion and each corresponding lower rib, are arranged to have mutually opposing inclined surfaces. The above arrangements make it easier for the upper and lower resin members 421 and 422 to be fitted to each other.

In the armature 23, the upper surface of the tooth 52 and a lower surface of the first top plate portion 61 of the upper resin member 421 are preferably arranged to be in contact with each other. Accordingly, the axial position of the upper resin member 421 with respect to the tooth 52 is determined based on a position of contact between the first top plate portion 61 and the upper surface of the tooth 52. Meanwhile, the lower surface of the tooth 52 and an upper surface of the first bottom plate portion 81 of the lower resin member 422 are preferably arranged to be in contact with each other. Accordingly, the axial position of the lower resin member 422 with respect to the tooth 52 is determined based on a position of contact between the first bottom plate portion 81 and the lower surface of the tooth 52.

In addition, referring to the enlarged drawing of FIG. 8, a lower end of each of each first upper decreased thickness portion 64 and each corresponding first upper rib 65 is axially opposed to an upper end of a corresponding one of the lower side wall portions 83 with a gap intervening therebetween. Moreover, an upper end of each of each first lower decreased thickness portion 84 and each corresponding first lower rib 85 is axially opposed to a lower end of a corresponding one of the upper side wall portions 63 with a gap intervening therebetween. Similarly, a lower end of each of each second upper decreased thickness portion 67 and each corresponding second upper rib 68 is axially opposed to an upper end of the lower outer wall portion 86 with a gap intervening therebetween. Moreover, an upper end of each of each second lower decreased thickness portion 87 and each corresponding second lower rib 88 is axially opposed to a lower end of the upper outer wall portion 66 with a gap intervening therebetween. Similarly, a lower end of each of each third upper decreased thickness portion 70 and each corresponding third upper rib 71 is axially opposed to an upper end of a corresponding one of the lower inner wall portions 89 with a gap intervening therebetween. Moreover, an upper end of each of each third lower decreased thickness portion 90 and each corresponding third lower rib 91 is axially opposed to a lower end of a corresponding one of the upper inner wall portions 69 with a gap intervening therebetween.

Accordingly, any variation in the axial dimension of any of the tooth 52 and the upper and lower resin members 421 and 422 will not easily result in contact between the upper and lower resin members 421 and 422. In particular, the stator core 41, which is defined by laminated steel sheets, tends to easily suffer errors in the axial dimension. According to the present preferred embodiment, however, a problematic arrangement of the upper and lower resin members 421 and 422 will not easily occur.

In addition, referring to the enlarged drawing of FIG. 8, each first upper rib 65 and a corresponding one of the first lower decreased thickness portions 84 according to the present preferred embodiment are arranged to have a pair of opposed surfaces parallel or substantially parallel to each other. This arrangement enables the first upper rib 65 to be arranged widely along a surface of the corresponding first lower decreased thickness portion 84. This contributes to further increasing the rigidity of each first upper decreased thickness portion 64. Similarly, each first lower rib 85 and a corresponding one of the first upper decreased thickness portions 64 are arranged to have a pair of opposed surfaces parallel or substantially parallel to each other. This arrangement enables the first lower rib 85 to be arranged widely along a surface of the corresponding first upper decreased thickness portion 64. This contributes to further increasing the rigidity of each first lower decreased thickness portion 84.

Similarly, each second upper rib 68 and a corresponding one of the second lower decreased thickness portions 87 according to the present preferred embodiment are arranged to have a pair of opposed surfaces parallel or substantially parallel to each other. In addition, each second lower rib 88 and a corresponding one of the second upper decreased thickness portions 67 are arranged to have a pair of opposed surfaces parallel or substantially parallel to each other. Moreover, each third upper rib 71 and a corresponding one of the third lower decreased thickness portions 90 are arranged to have a pair of opposed surfaces parallel to each other. Furthermore, each third lower rib 91 and a corresponding one of the third upper decreased thickness portions 70 are arranged to have a pair of opposed surfaces parallel or substantially parallel to each other.

In addition, referring to the enlarged drawing of FIG. 8, each first upper rib 65 according to the present preferred embodiment preferably includes an upper tapered surface 651 defined at a lower end portion of the surface opposed to the corresponding first lower decreased thickness portion 84. The distance between the upper tapered surface 651 and the corresponding first lower decreased thickness portion 84 is arranged to increase with decreasing height. Moreover, each first lower rib 85 according to the present preferred embodiment preferably includes a lower tapered surface 851 defined at an upper end portion of the surface opposed to the corresponding first upper decreased thickness portion 64. The distance between the lower tapered surface 851 and the corresponding first upper decreased thickness portion 64 is arranged to increase with increasing height. Fitting of the upper and lower resin members 421 and 422 to each other is facilitated by the upper and lower tapered surfaces 651 and 851.

Each of the second upper ribs 68, the second lower ribs 88, the third upper ribs 71, and the third lower ribs 91 also preferably includes a similar tapered surface.

In addition, referring to the enlarged drawing of FIG. 8, the upper resin member 421 according to the present preferred embodiment preferably includes a shoulder surface 72 defined between each upper side wall portion 63 and a corresponding one of the first upper decreased thickness portions 64. In addition, the upper resin member 421 according to the present preferred embodiment preferably further includes a shoulder surface 73 defined between each upper side wall portion 63 and each corresponding first upper rib 65. The circumferential width of a portion of the upper resin member 421 varies at each of the shoulder surfaces 72 and 73. This contributes to reducing the axial dimension of each of the first upper decreased thickness portions 64 and the first upper ribs 65 while increasing the axial dimension of each upper side wall portion 63. This contributes to further increasing the strength of the upper resin member 421.

Note that the upper resin member 421 may include inclined surfaces in place of the shoulder surfaces 72 and 73. In this case, the inclination of each inclined surface with respect to a horizontal plane is arranged to be smaller than the inclination of a surface of each of the first upper decreased thickness portions 64 and the first upper ribs 65, the surface facing the corresponding first lower decreased thickness portion 84, with respect to the horizontal plane.

Moreover, the lower resin member 422 according to the present preferred embodiment preferably includes a shoulder surface 92 defined between each lower side wall portion 83 and a corresponding one of the first lower decreased thickness portions 84. In addition, the lower resin member 422 according to the present preferred embodiment further includes a shoulder surface 93 defined between each lower side wall portion 83 and each corresponding first lower rib 85. The circumferential width of a portion of the lower resin member 422 varies at each of the shoulder surfaces 92 and 93. This contributes to reducing the axial dimension of each of the first lower decreased thickness portions 84 and the first lower ribs 85 while increasing the axial dimension of each lower side wall portion 83. This contributes to further increasing the strength of the lower resin member 422.

Note that the lower resin member 422 may include inclined surfaces in place of the shoulder surfaces 92 and 93. In this case, the inclination of each inclined surface with respect to the horizontal plane is arranged to be smaller than the inclination of a surface of each of the first lower decreased thickness portions 84 and the first lower ribs 85, the surface facing the corresponding first upper decreased thickness portion 64, with respect to the horizontal plane.

Furthermore, similar shoulder surfaces or inclined surfaces are preferably defined between the upper outer wall portion 66 and each second upper decreased thickness portion 67, between each upper inner wall portion 69 and a corresponding one of the third upper decreased thickness portions 70, between the lower outer wall portion 86 and each second lower decreased thickness portion 87, and between each lower inner wall portion 89 and a corresponding one of the third lower decreased thickness portions 90.

Furthermore, the upper resin member 421 according to the present preferred embodiment preferably includes a curved surface 74 defined between an upper surface of the first top plate portion 61 and a surface of each upper side wall portion 63 which faces the coil 43. In addition, the lower resin member 422 according to the present preferred embodiment preferably includes a curved surface 94 defined between a lower surface of the first bottom plate portion 81 and a surface of each lower side wall portion 83 which faces the coil 43. Each of these curved surfaces 74 and 94 is preferably arranged to have a radius of curvature that is about twice or more than twice the diameter of the conducting wire defining the coil 43, for example. This arrangement contributes to preventing the coil 43 from bulging in a direction away from the tooth 52 on each circumferential side of the tooth 52, and thereby bringing the coil 43 closer to each of the first upper decreased thickness portions 64 and the first lower decreased thickness portions 84. This contributes to further expanding the space in which the coil 43 is arranged. Note that each of the curved surfaces 74 and 94 is more preferably arranged to have a radius of curvature that is about three or more times the diameter of the conducting wire defining the coil 43, for example.

Other Preferred Embodiments

While preferred embodiments of the present invention have been described above, it is to be understood that the present invention is not limited to the above-described preferred embodiments.

Figure 9:
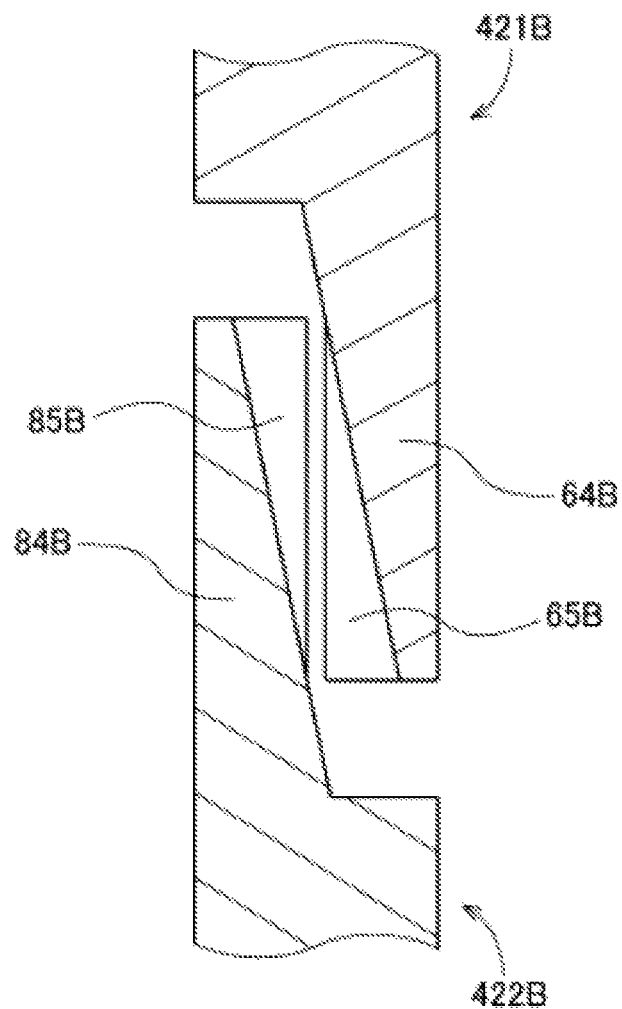
FIG. 9 is a partial vertical cross-sectional view of an upper resin member and a lower resin member according to another preferred embodiment of the present invention.

FIG. 9 is a partial vertical cross-sectional view of an upper resin member 421B and a lower resin member 422B according to a modification of a preferred embodiment of the present invention. In the modification of a preferred embodiment of the present invention illustrated in FIG. 9, a first upper rib 65B is arranged to extend from an axial position midway through a first upper decreased thickness portion 64B to a location corresponding to a lower end portion of the first upper decreased thickness portion 64B. In addition, a first lower rib 85B is arranged to extend from an axial position midway through a first lower decreased thickness portion 84B to a level of an upper end portion of the first lower decreased thickness portion 84B. Each rib may thus be arranged to extend over only a portion of the axial length of a corresponding one of the decreased thickness portions.

Figure 10:
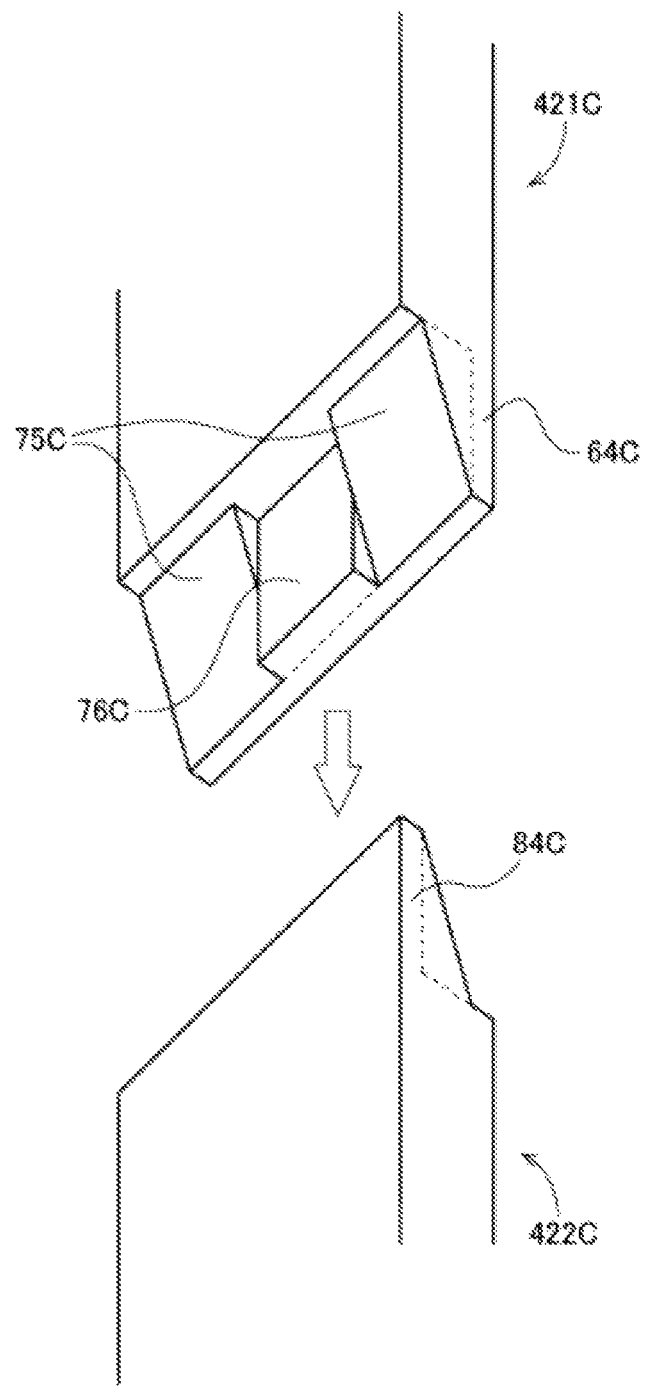
FIG. 10 is a partial exploded perspective view of an upper resin member and a lower resin member according to another preferred embodiment of the present invention.

FIG. 10 is a partial exploded perspective view of an upper resin member 421C and a lower resin member 422C according to another modification of a preferred embodiment of the present invention. In the modification of a preferred embodiment of the present invention illustrated in FIG. 10, triangular ribs 75C and a quadrilateral rib 76C are arranged alternately in the radial direction on a surface of a first upper decreased thickness portion 64C which is to face a first lower decreased thickness portion 84C. The circumferential thickness of each triangular rib 75C is arranged to decrease with decreasing height. The circumferential thickness of the quadrilateral rib 76C is arranged to be uniform throughout an entire axial length of the quadrilateral rib 76C. Similar triangular ribs and a similar quadrilateral rib are arranged in the lower resin member 422C.

An upper portion of each triangular rib 75C is preferably arranged to project above an upper portion of the quadrilateral rib 76C toward the first lower decreased thickness portion 84C. A lower portion of the quadrilateral rib 76C is arranged to project above a lower portion of each triangular rib 75C toward the first lower decreased thickness portion 84C. As described above, two types of ribs may be arranged on each decreased thickness portion. Note that a triangular rib whose surface has an angle of inclination different from that of each triangular rib 75C may be provided in place of the quadrilateral rib 76C.

In the modification of a preferred embodiment of the present invention illustrated in FIG. 9, the first upper rib 65B and the first lower rib 85B are circumferentially opposed to each other. In the modification of a preferred embodiment of the present invention illustrated in FIG. 10, the triangular ribs of the upper and lower resin members are circumferentially opposed to each other, and the quadrilateral ribs of the upper and lower resin members are circumferentially opposed to each other. As described above, the ribs of the upper and lower resin members may be opposed to each other.

Note that the shape of each member need not necessarily be the same shape as illustrated in the accompanying drawings of the present application. For example, the number of ribs arranged on each decreased thickness portion may be different from the number illustrated in the accompanying drawings of the present application. Also note that the insulator may not necessarily include all of the upper outer wall portion, the second upper decreased thickness portions, the second upper ribs, the upper inner wall portions, the third upper decreased thickness portions, the third upper ribs, the lower outer wall portion, the second lower decreased thickness portions, the second lower ribs, the lower inner wall portions, the third lower decreased thickness portions, and the third lower ribs.

Note that the stator core may be defined either by a single member or by a plurality of members combined together. Also note that the armature may be arranged either radially inward of the magnet(s) or radially outward of the magnet(s). That is, the plurality of teeth of the stator core may be arranged to extend either radially inward or radially outward from the annular core back.

Also note that features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:
1. An armature comprising:
a core back;
a plurality of teeth arranged to extend radially inward or radially outward from the core back;
insulators, each of which is arranged to cover a separate one of the teeth; and coils, each of which is defined by a conducting wire wound around a separate one of the insulators; wherein each insulator includes an upper resin member and a lower resin member;

the upper resin member includes:
- a top plate portion arranged to cover an upper surface of a corresponding one of the teeth;
- a pair of upper side wall portions, each of which is arranged to extend downward from a separate circumferential end portion of the top plate portion to cover an upper region of a separate one of circumferential side surfaces of the tooth;
- a pair of first upper decreased thickness portions, each of which is arranged to extend further downward from a lower end portion of a separate one of the upper side wall portions, each of the pair of first upper decreased thickness portions having a circumferential thickness smaller than that of each upper side wall portion; and
- a first upper rib;

the lower resin member includes:
- a bottom plate portion arranged to cover a lower surface of the tooth;
- a pair of lower side wall portions, each of which is arranged to extend upward from a separate circumferential end portion of the bottom plate portion to cover a lower region of a separate one of the circumferential side surfaces of the tooth;
- a pair of first lower decreased thickness portions, each of which is arranged to extend further upward from an upper end portion of a separate one of the lower side wall portions, each of the pair of first lower decreased thickness portions having a circumferential thickness smaller than that of each lower side wall portion; and
- a first lower rib;

an axial position of each of the first upper decreased thickness portions and the first upper rib is arranged to overlap at least partially with an axial position of each of the first lower decreased thickness portions and the first lower rib;

the first upper rib is arranged to project in a circumferential direction from a surface of a corresponding one of the first upper decreased thickness portions toward a corresponding one of the first lower decreased thickness portions;

the first lower rib is arranged to project in the circumferential direction from a surface of a corresponding one of the first lower decreased thickness portions toward a corresponding one of the first upper decreased thickness portions;

each of the circumferential thickness of each first upper decreased thickness portion and a combined circumferential thickness of the first upper decreased thickness portion and the first upper rib is arranged to decrease with decreasing height or to be uniform;

each of the circumferential thickness of each first lower decreased thickness portion and a combined circumferential thickness of the first lower decreased thickness portion and the first lower rib is arranged to decrease with increasing height or to be uniform;

a radial width of the first upper rib is arranged to decrease with decreasing height or to be uniform; and a radial width of the first lower rib is arranged to decrease with increasing height or to be uniform.

2. The armature according to claim 1, wherein the first upper rib and the corresponding first lower decreased thickness portion are circumferentially opposed to each other;

the first lower rib and the corresponding first upper decreased thickness portion are circumferentially opposed to each other; and the first upper rib and the first lower rib are arranged radially adjacent to each other.

3. The armature according to claim 1, wherein the upper surface of the tooth and a lower surface of the top plate portion are arranged to be in contact with each other; and the lower surface of the tooth and an upper surface of the bottom plate portion are arranged to be in contact with each other.

4. The armature according to claim 3, wherein a lower end of each of the first upper rib and the first upper decreased thickness portions is axially opposed to an upper end of a corresponding one of the lower side wall portions with a gap intervening therebetween; and an upper end of each of the first lower rib and the first lower decreased thickness portions is axially opposed to a lower end of a corresponding one of the upper side wall portions with a gap intervening therebetween.

5. The armature according to claim 1, wherein a total number of first upper ribs included in the upper resin member is more than one; and a total number of first lower ribs included in the lower resin member is more than one.

6. The armature according to claim 5, wherein the upper surface of the tooth and a lower surface of the top plate portion are arranged to be in contact with each other;

the lower surface of the tooth and an upper surface of the bottom plate portion are arranged to be in contact with each other;

a radial interval between adjacent ones of the first upper ribs is arranged to be greater than a radial dimension of each individual first lower rib; and a radial interval between adjacent ones of the first lower ribs is arranged to be greater than a radial dimension of each individual first upper rib.

7. The armature according to claim 1, wherein one of the pair of first lower decreased thickness portions arranged on both circumferential sides of the tooth is arranged between the tooth and one of the pair of first upper decreased thickness portions arranged on both circumferential sides of the tooth; and another one of the pair of first upper decreased thickness portions arranged on both circumferential sides of the tooth is arranged between the tooth and the another one of the pair of first lower decreased thickness portions arranged on both circumferential sides of the tooth.

8. The armature according to claim 6, wherein one of the pair of first lower decreased thickness portions arranged on both circumferential sides of the tooth is arranged between the tooth and one of the pair of first upper decreased thickness portions arranged on both circumferential sides of the tooth; and another one of the pair of first upper decreased thickness portions arranged on both circumferential sides of the tooth is arranged between the tooth and the another one of the pair of first lower decreased thickness portions arranged on both circumferential sides of the tooth.

9. The armature according to claim 1, wherein the first upper rib and the corresponding first lower decreased thickness portion include a pair of opposed surfaces parallel or substantially parallel to each other; and the first lower rib and the corresponding first upper decreased thickness portion include a pair of opposed surfaces parallel or substantially parallel to each other.

10. The armature according to claim 1, wherein
the first upper rib includes an upper tapered surface provided at a lower end portion of a surface thereof opposed to the corresponding first lower decreased thickness portion, the upper tapered surface becoming progressively more distant from the corresponding first lower decreased thickness portion with decreasing height; and
the first lower rib includes a lower tapered surface provided at an upper end portion of a surface thereof opposed to the corresponding first upper decreased thickness portion, the lower tapered surface becoming progressively more distant from the corresponding first upper decreased thickness portion with increasing height.

11. The armature according to claim 1, wherein a radial width of the rib projecting from one of the first upper decreased thickness portion and the first lower decreased thickness portion which is closer to a corresponding one of the coils is arranged to be greater than a radial width of the rib projecting from the other one of the first upper decreased thickness portion and the first lower decreased thickness portion.

12. The armature according to claim 1, wherein
the upper resin member includes a curved surface defined between an upper surface of the top plate portion and a surface of each upper side wall portion which faces a corresponding one of the coils, the curved surface having a radius of curvature twice or more than twice a diameter of the conducting wire; and
the lower resin member includes a curved surface defined between a lower surface of the bottom plate portion and a surface of each lower side wall portion which faces the corresponding coil, the curved surface having a radius of curvature twice or more than twice the diameter of the conducting wire.

13. The armature according to claim 8, wherein
the upper resin member further includes an inclined surface or a shoulder surface defined between each upper side wall portion and a corresponding one of the first upper decreased thickness portions, the inclined surface having a smaller inclination with respect to a horizontal plane than that of a surface of the corresponding first upper decreased thickness portion which faces a corresponding one of the first lower decreased thickness portions; and
the lower resin member further includes an inclined surface or a shoulder surface defined between each lower side wall portion and a corresponding one of the first lower decreased thickness portions, the inclined surface having a smaller inclination with respect to the horizontal plane than that of a surface of the corresponding first lower decreased thickness portion which faces a corresponding one of the first upper decreased thickness portions.

14. The armature according to claim 8, wherein
the upper resin member further includes an inclined surface or a shoulder surface defined between each upper side wall portion and each corresponding one of the first upper ribs, the inclined surface having a smaller inclination with respect to a horizontal plane than that of a surface of the corresponding first upper rib which faces a corresponding one of the first lower decreased thickness portions; and
the lower resin member further includes an inclined surface or a shoulder surface defined between each lower side wall portion and each corresponding one of the first lower ribs, the inclined surface having a smaller inclination with respect to the horizontal plane than that of a surface of the corresponding first lower rib which faces a corresponding one of the first upper decreased thickness portions.

15. The armature according to claim 8, wherein
each first upper rib is arranged to extend in an axial direction from a location corresponding to an upper end portion of each first upper decreased thickness portion to a location corresponding to a lower end portion of the first upper decreased thickness portion; and
each first lower rib is arranged to extend in the axial direction from a location corresponding to a lower end portion of each first lower decreased thickness portion to a location corresponding to of an upper end portion of the first lower decreased thickness portion.

16. The armature according to claim 8, wherein the upper resin member further includes:
an upper outer wall portion arranged to cover an upper region of a surface of the core back which faces a corresponding one of the coils;
a pair of second upper decreased thickness portions each of which is arranged to extend further downward from a lower end portion of the upper outer wall portion, each second upper decreased thickness portion having a radial thickness smaller than a radial thickness of the upper outer wall portion; and
a second upper rib arranged to project in a radial direction from a surface of a corresponding one of the second upper decreased thickness portions;
the lower resin member further includes:
a lower outer wall portion arranged to cover a lower region of the surface of the core back which faces the corresponding coil;
a pair of second lower decreased thickness portions each of which is arranged to extend further upward from an upper end portion of the lower outer wall portion, each second lower decreased thickness portion having a radial thickness smaller than a radial thickness of the lower outer wall portion; and
a second lower rib arranged to project in the radial direction from a surface of a corresponding one of the second lower decreased thickness portions;
an axial position of each of the second upper decreased thickness portions and the second upper rib is arranged to overlap at least partially with an axial position of each of the second lower decreased thickness portions and the second lower rib;
the second upper rib and a corresponding one of the second lower decreased thickness portions are radially opposed to each other; and
the second lower rib and a corresponding one of the second upper decreased thickness portions are radially opposed to each other.

17. The armature according to claim 8, wherein each of the teeth includes a tip portion arranged to extend out in the circumferential direction;
the upper resin member further includes:
a pair of upper inner wall portions, each of which is arranged to cover an upper region of a surface of the tip portion which faces a corresponding one of the coils;
a pair of third upper decreased thickness portions, each of which is arranged to extend further downward from a lower end portion of a separate one of the upper inner wall portions, each third upper decreased thickness portion having a radial thickness smaller than that of each upper inner wall portion; and a third upper rib arranged to project in a radial direction from a surface of a corresponding one of the third upper decreased thickness portions;

the lower resin member further includes:

a pair of lower inner wall portions each of which is arranged to cover a lower region of the surface of the tip portion which faces the corresponding coil;

a pair of third lower decreased thickness portions each of which is arranged to extend further upward from an upper end portion of a separate one of the lower inner wall portions, each third lower decreased thickness portion having a radial thickness smaller than that of each lower inner wall portion; and a third lower rib arranged to project in the radial direction from a surface of a corresponding one of the third lower decreased thickness portions;

an axial position of each of the third upper decreased thickness portions and the third upper rib is arranged to overlap at least partially with an axial position of each of the third lower decreased thickness portions and the third lower rib;

the third upper rib and a corresponding one of the third lower decreased thickness portions are radially opposed to each other; and the third lower rib and a corresponding one of the third upper decreased thickness portions are radially opposed to each other.

18. A motor comprising:

the armature of claim 1; and a magnet including a pole surface opposed to an end surface of each of the plurality of teeth; wherein the armature and the magnet are supported to be rotatable relative to each other about a central axis.

19. A motor comprising:

the armature of claim 8; and a magnet including a pole surface opposed to an end surface of each of the plurality of teeth; wherein the armature and the magnet are supported to be rotatable relative to each other about a central axis.

* * * * *